United States Patent
Chun et al.

(10) Patent No.: US 8,102,806 B2
(45) Date of Patent: Jan. 24, 2012

(54) METHOD OF SUPPORTING DATA RETRANSMISSION IN A WIRELESS COMMUNICATION SYSTEM

(75) Inventors: Sung Duck Chun, Anyang-si (KR); Young Dae Lee, Anyang-si (KR); Sung Jun Park, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 358 days.

(21) Appl. No.: 12/448,806

(22) PCT Filed: Jan. 8, 2008

(86) PCT No.: PCT/KR2008/000105
§ 371 (c)(1),
(2), (4) Date: Jul. 8, 2009

(87) PCT Pub. No.: WO2008/084961
PCT Pub. Date: Jul. 17, 2008

(65) Prior Publication Data
US 2010/0278121 A1 Nov. 4, 2010

(30) Foreign Application Priority Data
Jan. 9, 2007 (KR) .................. 10-2007-0002642

(51) Int. Cl.
*H04W 4/00* (2009.01)
(52) U.S. Cl. .................. 370/329; 370/349; 370/395.4
(58) Field of Classification Search .......... 370/349–351, 370/394–427, 328–338; 455/561–562.1
See application file for complete search history.

(56) References Cited

U.S. PATENT DOCUMENTS

2007/0140261 A1* 6/2007 Wang et al. .............. 370/395.42
2009/0196239 A1* 8/2009 Lee et al. .................. 370/329

FOREIGN PATENT DOCUMENTS

EP 1 557 968 7/2005
WO WO 2006/138379 12/2006

OTHER PUBLICATIONS

LG Electronics: "Modification of Downlink Asynchronous HARQ Scheme", 3GPP TSG-RAN WG1, R1-063175, Nov. 6, 2005.
Samsung: "Low Overhead Asynchronous Adaptive Hybrid ARQ", 3GPP TSG-RAN WG1, R1-061338, Jan. 21, 2009.
NTT Docomo et al.: "Hybrid ARQ Scheme for E-UTRA Downlink", 3GPP TSG-RAN WG1 and WG2, R2-060840, Mar. 27, 2006.
Ericsson: "Persistent Scheduling for E-UTRA", 3GPP TSG-RAN WG1, R1-060099, Jan. 23, 2006.

* cited by examiner

*Primary Examiner* — Pao Sinkantarakorn
*Assistant Examiner* — Iqbal Zaidi
(74) *Attorney, Agent, or Firm* — McKenna Long & Aldridge LLP

(57) ABSTRACT

A method of supporting data retransmission in a wireless communication system is disclosed. A method of supporting data retransmission in a wireless communication system which uses multiple carriers includes receiving NACK from a user equipment in response to a transmitted packet, transmitting scheduling information to the user equipment, the scheduling information indicating change of radio resources previously allocated for transmission of a retransmission packet, and transmitting the retransmission packet in accordance with the scheduling information.

5 Claims, 8 Drawing Sheets

METHOD OF SUPPORTING DATA RETRANSMISSION IN A WIRELESS COMMUNICATION SYSTEM

This application is a national phase entry of International Application No. PCT/KR2008/000105, filed Jan. 8, 2008 and claims priority to Korean Patent Application No. 10-2007-0002642 filed Jan. 9, 2007, all of which are hereby incorporated by reference in their entireties.

TECHNICAL FIELD

The present invention relates to a wireless communication system, and more particularly, to a method of supporting data retransmission in a wireless communication system.

BACKGROUND ART

In a recent wireless communication system, an auto repeat request (ARQ) scheme or a hybrid auto repeat request (HARQ) scheme is mainly used to improve throughput, thereby enabling desirable communication.

According to the ARQ or HARQ scheme, a receiving side feeds the presence of error in received data back to a transmitting side, so that the transmitting side can perform data retransmission when any error is found in the received data. In other words, according to the ARQ or HARQ scheme, after the transmitting side transmits data to the receiving side, the receiving side transmits a positive acknowledgement signal (ACK) to the transmitting side if it receives the transmitted data without any error whereas the receiving side transmits a negative acknowledgement signal (NACK) to the transmitting side if any error is found in the received data, whereby the transmitting side retransmits data to allow the receiving side to exactly receive the data:

FIG. 1 illustrates a hybrid ARQ (HARQ) scheme in WCDMA system according to the related art. In FIG. 1, a base station determines a user equipment which will receive a packet and formats (coding rate, modulation mode, data quantity, etc.) of the packet, which are to be transmitted to the user equipment, and reports information related to the determined formats to the user equipment through a downlink control channel (HS-SCCH) and transmits corresponding data packets (HS-DSCH) at this time. The user equipment can identify formats of the packet to be transmitted thereto and a transmission timing point by receiving the downlink control channel, and can receive the packet by using the identified results.

After receiving the packet, the user equipment decodes the received packet. If decoding is successfully performed, the user equipment transmits ACK to the base station. The base station which has received ACK recognizes that packet transmission to the user equipment has been successfully performed, and then performs next packet transmission. If the user equipment fails to decode the packet, the user equipment transmits NACK to the base station, and the base station which has received NACK recognizes that packet transmission to the user equipment has been failed and configures the same data in the same packet type or a new packet type at a proper timing point to perform retransmission. At this time, the user equipment combines the retransmitted packet with the packet, which have been previously received but failed in decoding, in various manners to try decoding again.

In a wireless communication system which uses a multi-carrier mode such as orthogonal frequency division multiplexing (OFDM) or a single carrier-frequency division multiple access (SC-FDMA), radio resources are a set of continuous sub-carriers and are defined by a time-frequency region of a two-dimensional sphere. In this case, when the HARQ scheme is used, radio resources for transmission of control information and retransmission data for HARQ should be allocated efficiently to avoid their waste.

DISCLOSURE OF THE INVENTION

Accordingly, the present invention is directed to a method of supporting data retransmission in a wireless communication system and a user equipment for the same, which substantially obviate one or more problems due to limitations and disadvantages of the related art.

An object of the present invention is to provide a method of supporting data retransmission in a wireless communication system and a user equipment for the same, in which limited radio resources can be used efficiently.

To achieve these objects and other advantages and in accordance with the purpose of the invention, as embodied and broadly described herein, a method of supporting data retransmission in a wireless communication system which uses multiple carriers comprises receiving a negative acknowledgement signal (NACK) from a user equipment in response to a transmitted packet, transmitting scheduling information to the user equipment, the scheduling information indicating change of radio resources previously allocated for transmission of a retransmission packet, and transmitting the retransmission packet in accordance with the scheduling information.

In another aspect of the present invention, a method of supporting data retransmission in a wireless communication system which uses multiple carriers comprises transmitting a negative acknowledgement signal (NACK) in response to a packet transmitted from a base station, receiving scheduling information from the base station, the scheduling information indicating change of radio resources previously allocated for transmission of a retransmission packet, and receiving the retransmission packet in accordance with the scheduling information.

In other aspect of the present invention, a user equipment for wireless communication in a wireless communication system which uses multiple carriers is configured to perform the steps of transmitting a negative acknowledgement signal (NACK) in response to a packet transmitted from a base station, receiving scheduling information from the base station, the scheduling information indicating change of radio resources previously allocated for transmission of a retransmission packet, and receiving the retransmission packet in accordance with the scheduling information.

The scheduling information includes at least one of indication information indicating that the retransmission packet will not be transmitted through the radio resources previously allocated and information indicating radio resources newly allocated for transmission of the retransmission packet. The radio resources correspond to a time-frequency region.

BRIEF DESCRIPTION OF THE DRAWINGS

FIG. 4A and FIG. 4B illustrate a structure of a radio interface protocol between a user equipment (UE) and E-UTRAN, in which FIG. 4A is a schematic view of a control plane protocol and FIG. 4B is a schematic view of a user plane protocol;

BEST MODE FOR CARRYING OUT THE INVENTION

Hereinafter, structures, operations, and other features of the present invention will be understood readily by the preferred embodiments of the present invention, examples of which are illustrated in the accompanying drawings. Embodiments described later are examples in which technical features of the present invention are applied to E-UMTS (Evolved Universal Mobile Telecommunications System).

Figure 1:
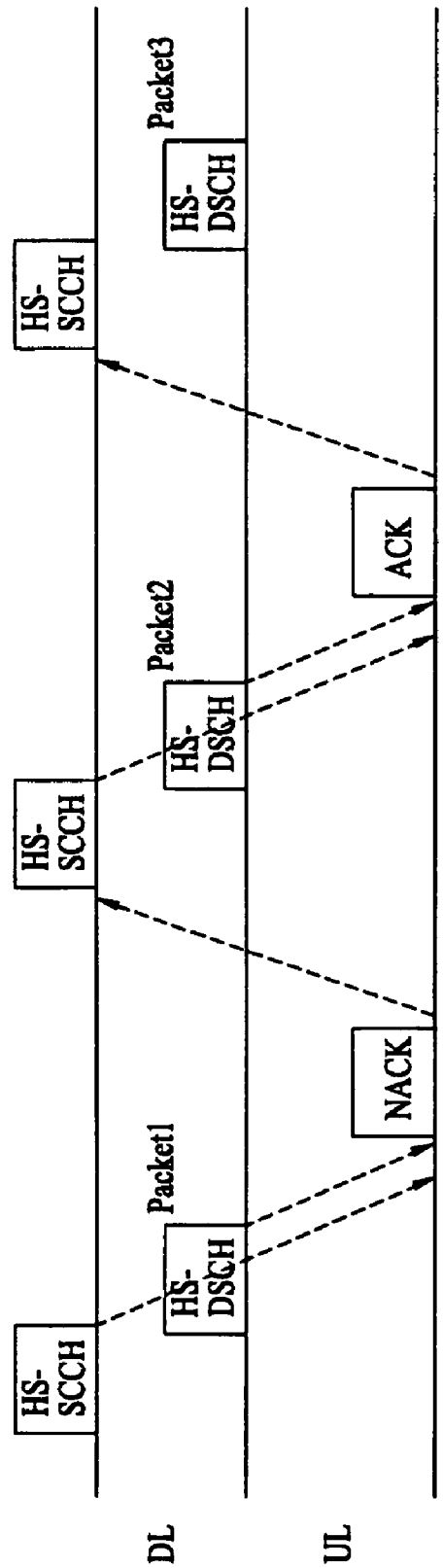
FIG. 1 illustrates a hybrid ARQ (HARQ) scheme in a WCDMA system according to the related art.
Figure 2:
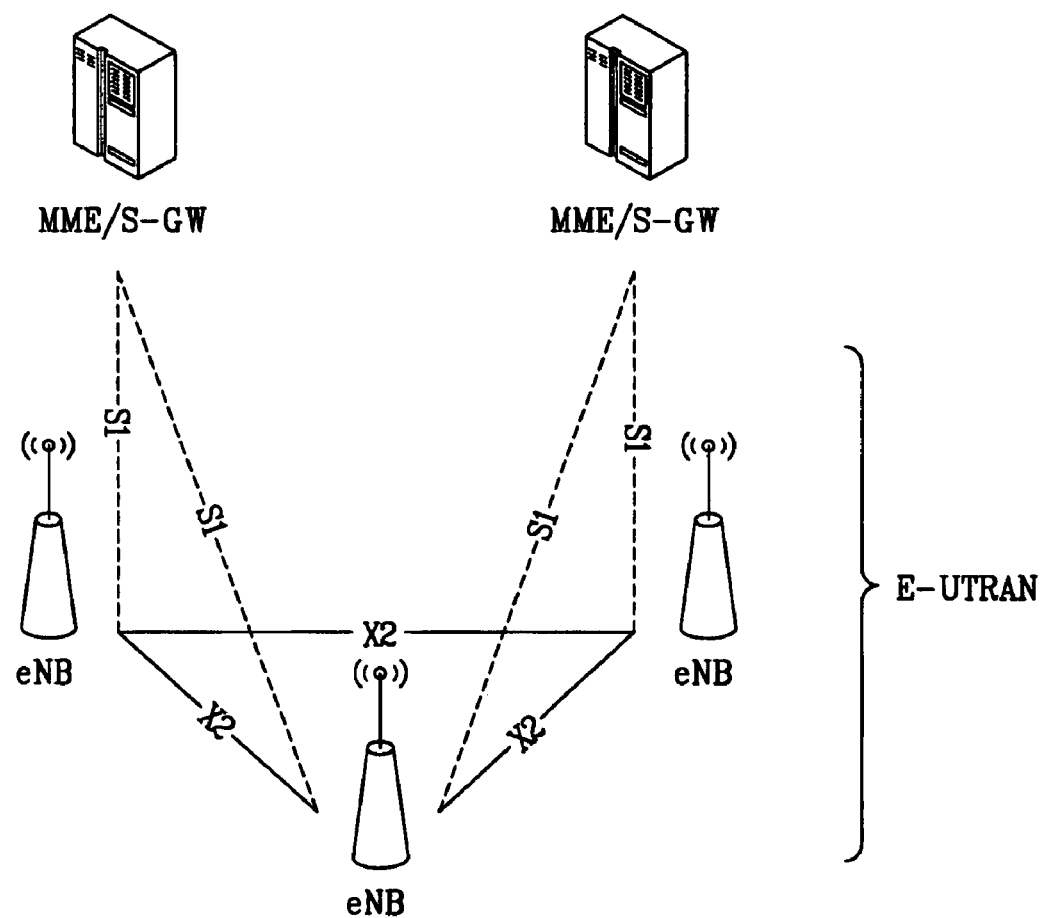
FIG. 2 illustrates a network structure of an E-UMTS (Evolved-Universal Mobile Telecommunications System)

FIG. 2 illustrates a network structure of an E-UMTS. An E-UMTS is a system evolving from the conventional WCDMA UMTS and its basic standardization is currently handled by the 3GPP ($3^{rd}$ GenerationPartnership Project). The E-UMTS can also be called an LTE (Long Term Evolution) system. [http://www.3gpp.org/ftp/Specs/2006-12/] and [http://www.3gpp.org/ftp/Specs/html-info/GanttChart-Level-2.htm] can be referred to obtain detailed information about the UMTS and E-UMTS.

FIG. 2 illustrates a network structure of an E-UMTS. An E-UMTS is a system evolving from the conventional WCDMA UMTS and its basic standardization is currently handled by the 3GPP ($3^{rd}$ Generation Partnership Project). The E-UMTS can also be called an LTE (Long Term Evolution) system. Release 7 and Release 8 of 3GPP technical specifications ($3^{rd}$ Generation Partnership Project; Technical Specification Group Radio Access Network) can be referred to obtain detailed information about the UMTS and E-UMTS.

Referring to FIG. 2, an E-UTRAN includes base stations (hereinafter, referred to as 'eNode B' or 'eNB'), wherein respective eNBs are connected with each other through X2 interface. Also, each of eNBs is connected with a user equipment (UE) through a radio interface and connected with EPC (Evolved Packet Core) through S1 interface. The EPC includes MME (Mobility Management Entity)/SAE (System Architecture Evolution) gateway.

Layers of a radio interface protocol between a user equipment and a network can be classified into a first layer L1, a second layer L2 and a third layer L3 based on three lower layers of OSI (Open System Interconnection) standard model widely known in communication systems. A physical layer belonging to the first layer L1 provides an information transfer service using a physical channel. A radio resource control (hereinafter, abbreviated as 'RRC') layer located at the third layer plays a role in controlling radio resources between the user equipment and the network. For this, the RRC layer enables RRC messages to be exchanged between the UE and the network. The RRC layer can be distributively located at network nodes including Node B, an AG and the like or can be independently located at either the Node B or the AG.

Figure 3:
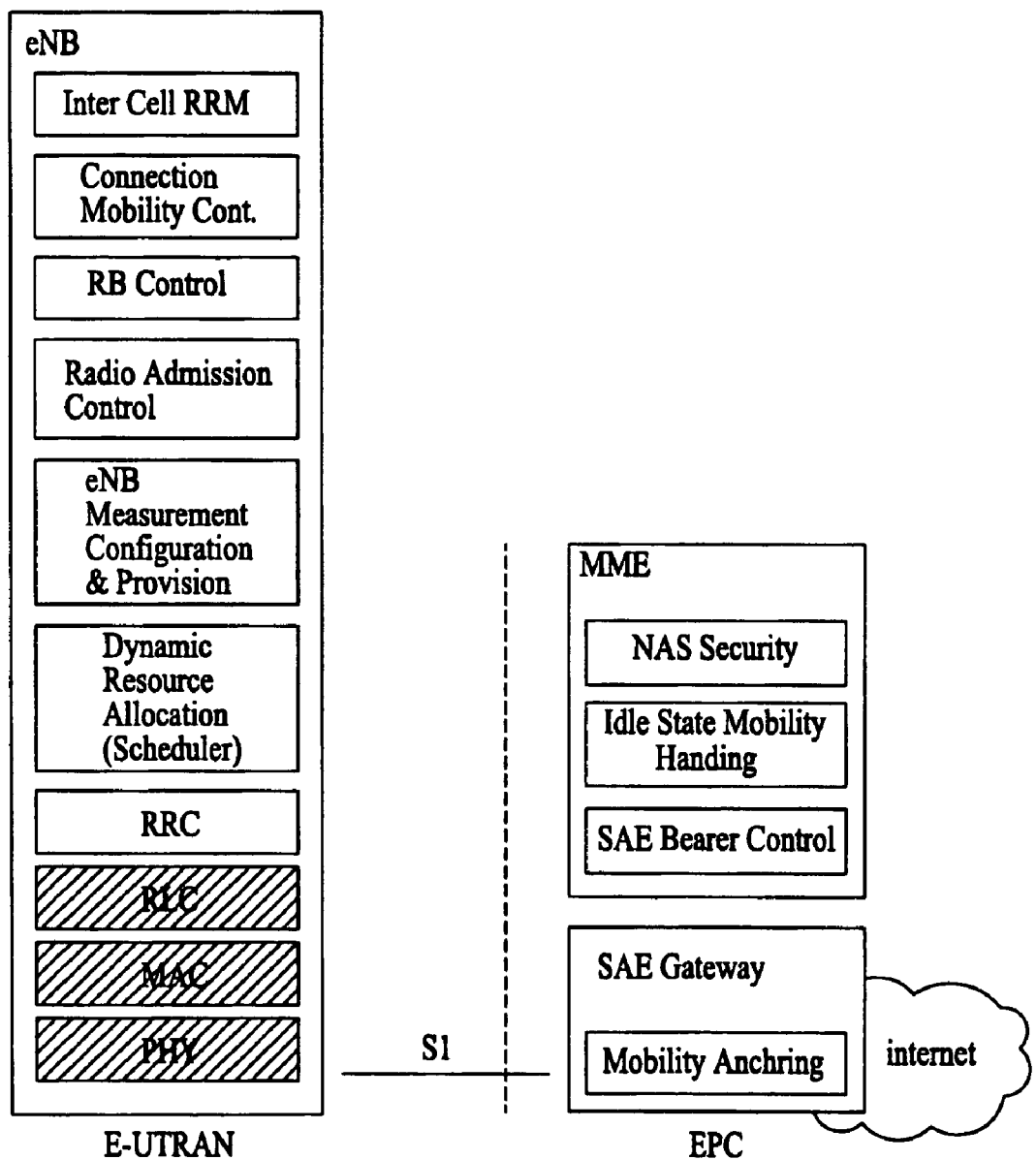
FIG. 3 is a schematic view illustrating an E-UTRAN (Evolved Universal Terrestrial Radio Access Network)

FIG. 3 is a schematic view illustrating an E-UTRAN (UMTS terrestrial radio access network). In FIG. 3, a hatching part represents functional entities of a user plane and a non-hatching part represents functional entities of a control plane.

Figure 4A:
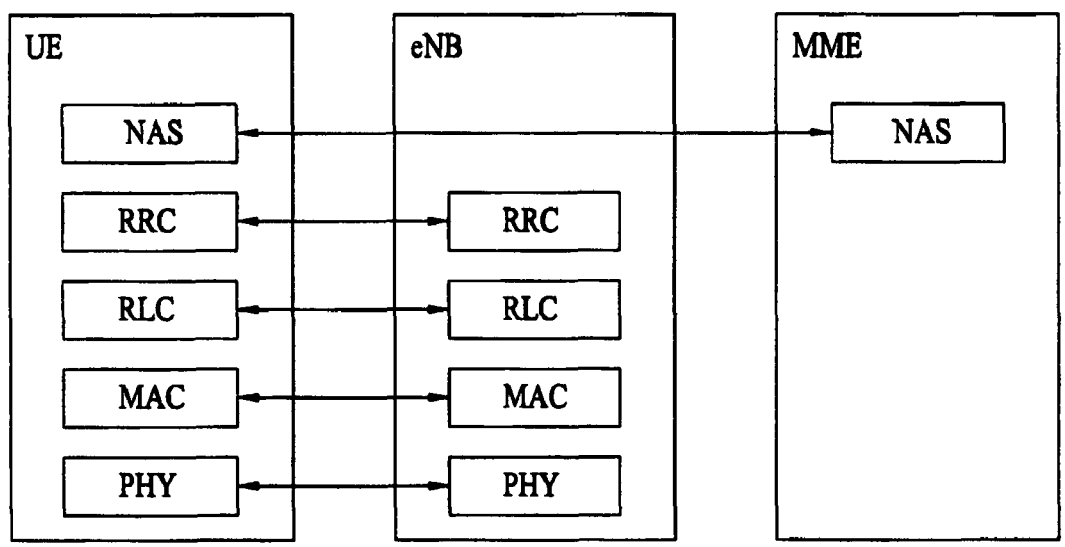
Figure 4B:
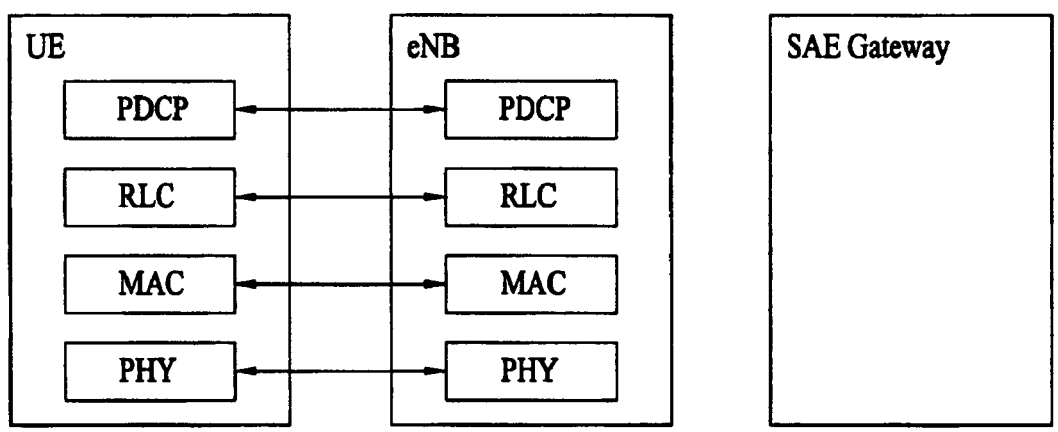

FIG. 4A and FIG. 4B illustrate a structure of a radio interface protocol between the user equipment (UE) and the E-UTRAN, in which FIG. 4A is a schematic view of a control plane protocol and FIG. 4B is a schematic view of a user plane protocol. Referring to FIG. 4A and FIG. 4B, a radio interface protocol vertically includes a physical layer, a data link layer, and a network layer and horizontally includes a user plane for data information transfer and a control plane for signaling transfer. The protocol layers in FIG. 4A and FIG. 4B can be classified into L1 (first layer), L2 (second layer), and L3 (third layer) based on three lower layers of the open system interconnection (OSI) standard model widely known in the communications systems.

The physical layer as the first layer provides information transfer service to an upper layer using physical channels. The physical layer (PHY) is connected to a medium access control (hereinafter, abbreviated as 'MAC') layer above the physical layer via transport channels. Data are transferred between the medium access control layer and the physical layer via the transport channels. Moreover, data are transferred between different physical layers, and more particularly, between one physical layer of a transmitting side and the other physical layer of a receiving side via the physical channels. The physical channel of the E-UMTS is modulated according to an orthogonal frequency division multiplexing (OFDM) scheme, and time and frequency are used as radio resources.

The medium access control (hereinafter, abbreviated as 'MAC') layer of the second layer provides a service to a radio link control (hereinafter, abbreviated as 'RLC') layer above the MAC layer via logical channels. The RLC layer of the second layer supports reliable data transfer. In order to effectively transmit data using IP packets (e.g., IPv4 or IPv6) within a radio-communication period having a narrow bandwidth, a PDCP layer of the second layer (L2) performs header compression to reduce the size of unnecessary control information.

A radio resource control (hereinafter, abbreviated as 'RRC') layer located on a lowest part of the third layer is defined in the control plane only and is associated with configuration, reconfiguration and release of radio bearers (hereinafter, abbreviated as 'RBs') to be in charge of controlling the logical, transport and physical channels. In this case, the RB means a service provided by the second layer for the data transfer between the user equipment and the UTRAN.

As downlink transport channels carrying data from the network to user equipments, there are provided a broadcast channel (BCH) carrying system information, a paging channel (PCH) carrying paging message, and a downlink shared channel (SCH) carrying user traffic or control messages. The traffic or control messages of a downlink multicast or broadcast service can be transmitted via the downlink SCH or an additional downlink multicast channel (MCH). Meanwhile, as uplink transport channels carrying data from user equipments to the network, there are provided a random access channel (RACH) carrying an initial control message and an uplink shared channel (UL-SCH) carrying user traffic or control message.

As logical channels located above the transport channels and mapped with the transport channels, there are provided a broadcast channel (BCCH), a paging control channel (PCCH), a common control channel (CCCH), a multicast control channel (MCCH), and a multicast traffic channel (MTCH).

In the E-UMTS system, an OFDM is used on the downlink and a single carrier frequency division multiple access (SC-FDMA) is used on the uplink. The OFDM scheme using multiple carriers allocates resources by unit of multiple sub-carriers including a group of carriers and utilizes an orthogonal frequency division multiple access (OFDMA) as an access scheme.

A physical layer of an OFDM or OFDMA system divides active carriers into a plurality of groups and transmits respective groups to different receiving sides. Radio resources allocated to each user equipment are defined by a time-frequency region on a two-dimensional sphere and are a set of continuous sub-carriers. A time-frequency region in the OFDM or OFDMA scheme is a rectangular form sectioned by time and sub-carrier coordinates. In other words, one time-frequency region could be a rectangular form sectioned by at least one symbol on a time axis and a plurality of sub-carriers on a frequency axis. Such a time-frequency region can be allocated to an uplink for a specific user equipment, or an eNB can transmit the time-frequency region to a specific user equipment in a downlink. In order to define such a time-frequency region on the two-dimensional sphere, the number of OFDM symbols and the number of continuous sub-carriers starting from a point having an offset from a reference point should be given.

The E-UMTS which is currently being discussed uses 10 ms radio frame comprising 20 sub-frames. Namely, a sub-frame has a length of 0.5 ms. A resource block comprises one sub-frame and twelve sub-carriers, each of which is 15 kHz. One sub-frame comprises a plurality of OFDM symbols and a part (for example, first symbol) of the plurality of OFDM symbols can be used for transmission of L1/L2 control information.

Figure 5:
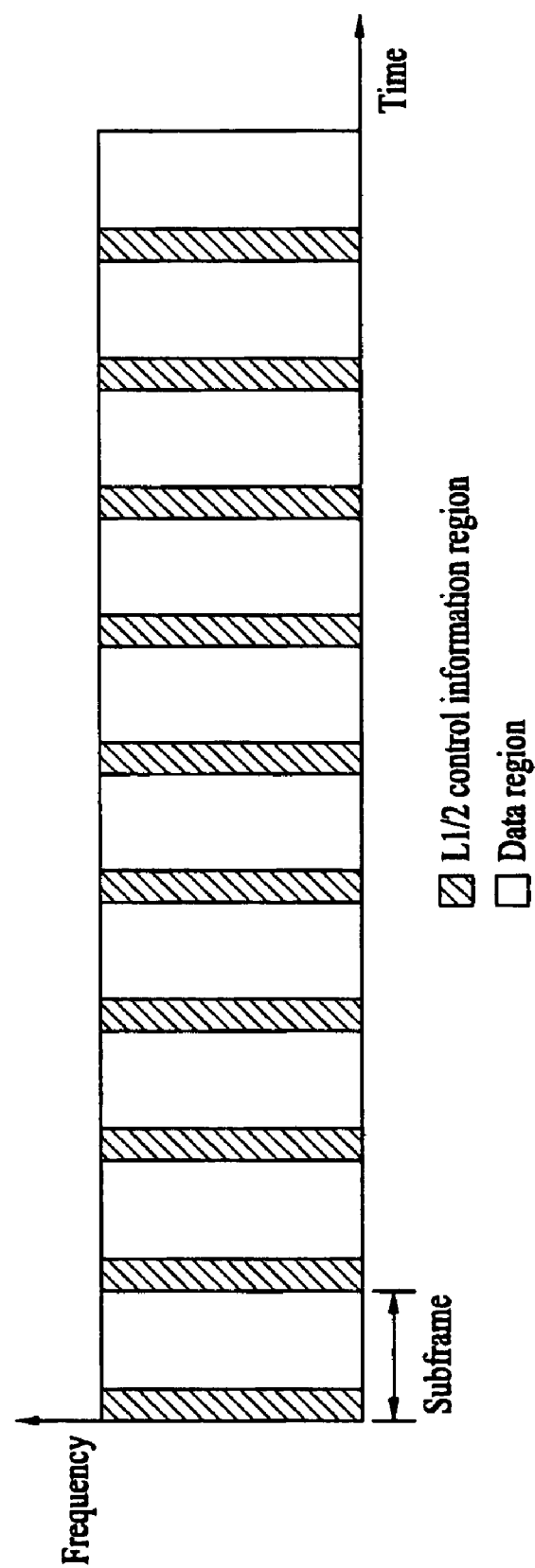
FIG. 5 illustrates an example of a structure of physical channels used in an E-UMTS system.

FIG. 5 is a diagram illustrating a structure of physical channels used in the E-UMTS. In FIG. 5, a sub-frame comprises an L1/L2 control information transmission region (the hatching part) and a data transmission region (the non-hatching part).

One embodiment of the HARQ scheme which can be applied to the E-UMTS will be described below.

The base station transmits downlink scheduling information (hereinafter, referred to as 'DL scheduling information') through DL L1/L2 control channel to transmit data to the user equipment in accordance with the HARQ scheme.

The DL scheduling information includes user equipment identifier (UE ID) or group identifier (group ID) of user equipments, location and duration (resource assignment and duration of assignment) information of radio resources allocated for transmission of downlink data, modulation mode, payload size, transmission parameters such as MIMO related information, HARQ process information, redundancy version, and new data indicator.

The DL scheduling information can be transferred through the DL L1/L2 control channel even when retransmission is performed. In this case, corresponding information may be changed depending on channel status. For example, if channel status is better than that of initial transmission, the information can be transmitted at a high bit rate by changing the modulation mode or the payload size. By contrast, if channel status is not good, the information can be transmitted at a bit rate lower than that of initial transmission.

The user equipment monitors the DL L1/L2 control channel per TTI to identify its DL scheduling information and then receives data from the base station by using the DL scheduling information.

However, since information that can be transmitted to the DL L1/L2 control channel is limited, it is difficult to transmit DL scheduling information for a plurality of user equipments in one TTI. Thus, DL scheduling information may be transmitted through the DL L1/L2 control channel in case of initial transmission, and then the DL scheduling information at the time of initial transmission may be used continuously for retransmission. In other words, if the user equipment finds its DL scheduling information included in the DL L1/L2 control channel while monitoring the DL L1/L2 control channel, the user equipment receives data in accordance with the DL scheduling information.

If the user equipment does not receive the data normally, it transmits NACK to the base station to request retransmission. Then, the base station retransmits the data to the user equipment without DL scheduling information. In other words, if the user equipment has received the data and has transmitted NACK, it can receive data using DL scheduling information at the time of initial transmission even without DL scheduling information through the DL L1/L2 control channel after a given time period. In this case, since it is not necessary to transmit DL scheduling information for retransmission data through the DL L1/L2 control channel during data retransmission, radio resources can be saved.

Figure 6:
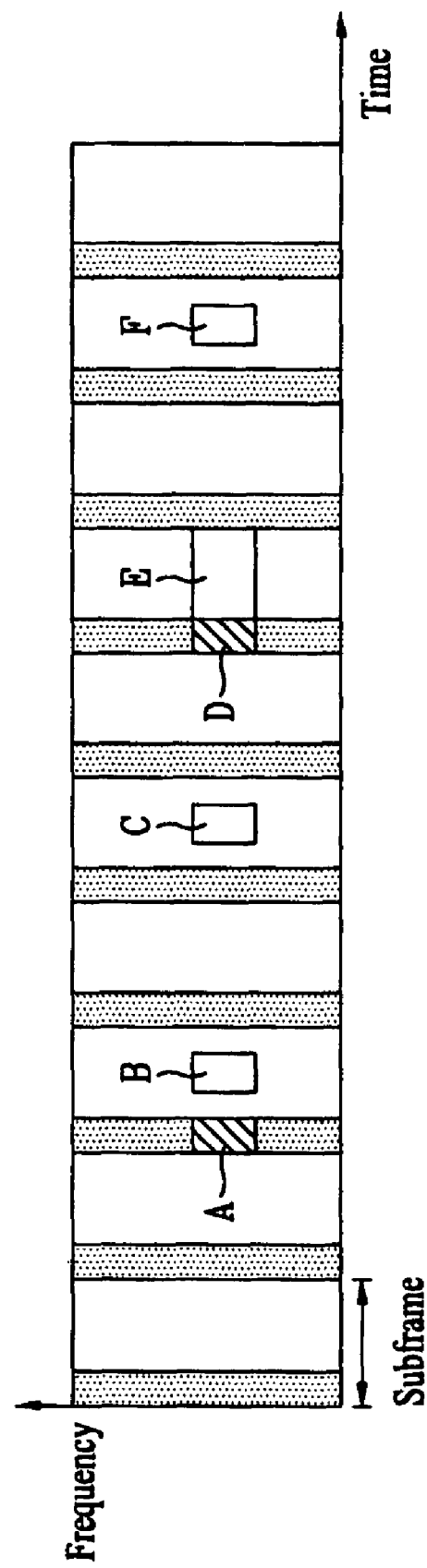
FIG. 6 and FIG. 7 illustrate time-frequency planes according to the embodiments of the present invention.

FIG. 6 illustrates a time-frequency plane according to one embodiment of the present invention. The embodiment of FIG. 6 is to support the HARQ scheme when radio resources previously allocated for data retransmission in the aforementioned HARQ scheme are required for reallocation to provide other service having a higher priority.

Referring to FIG. 6, a base station transmits DL scheduling information for a packet to the user equipment through a region 'A' in case of only initial transmission of the packet, and transmits the initial packet to the user equipment through a region 'B' in accordance with the DL scheduling information. If the base station retransmits the packet as it receives NACK from the user equipment in response to the transmitted packet, it transmits a retransmission packet through a region 'C' by using DL scheduling information for the initial packet without separate DL scheduling information.

In view of the user equipment, the user equipment acquires DL scheduling information through the region 'A' on the DL L1/L2 control channel during initial transmission of the packet and thus receives the initial packet through the region 'B.' If the user equipment fails to receive the initial packet successfully, it transmits NACK to the base station. After transmitting NACK, the user equipment receives the retransmission packet from the base station through the region 'C' without separate DL scheduling information after a given time period which is previously set by the base station. The DL scheduling information transmitted to the DL L1/L2 control channel during the initial transmission of the packet is used as information required for receiving the retransmission packet. In other words, the user equipment receives data through the same sub-carriers as those used for initial transmission of the packet in a frequency axis in accordance with the same transmission parameters as those used for initial transmission of the packet after a given time period passes from a given reference timing point (for example, NACK transmission timing point).

If the user equipment does not successfully receive the retransmission packet transmitted through the region 'C,' it transmits NACK to the base station again. At the time when the base station intends to perform retransmission of the packet as it receives NACK from the user equipment, if radio resources (region 'E' of FIG. 6) to be used for retransmission are required for data transmission of other services (for example, a service having a higher priority), the base station allocates the radio resources for the service having a higher priority.

The user equipment predicts that a retransmission packet will be transmitted from the base station through the region 'E.' Accordingly, if the base station transmits data corresponding to the service having a higher priority through the region 'E' without separate scheduling information, error occurs in the user equipment. To prevent the error from occurring, the base station transmits DL scheduling information to the user equipment through a region 'D' before transmitting the data of the service having a higher priority through the region 'E.'

The DL scheduling information transmitted through the region 'D' includes information indicating that a retransmission packet in response to NACK received from the user equipment are not transmitted through the region 'E' and indicating separate radio resources to which the retransmission packet will be transmitted, in addition to the scheduling information required for receiving the data transmitted through the region 'E.' For example, the DL scheduling information transmitted through the region 'D' includes an indicator indicating that a repetition period for transmission of the retransmission packet is skipped and then a next transmission period is used to transmit the retransmission packet. In this case, the retransmission packet is transmitted through a region 'F' corresponding to the next transmission period. The scheduling information required for receiving the data transmitted through the region 'E' may be transmitted through other L1/L2 control channel region not the region 'D.'

In more detail, supposing that the repetition period of retransmission includes 5 TTIs, there may be transmission of an initial packet in the Nth TTI. If retransmission is required as NACK is received from the user equipment, a packet will be retransmitted in (N+5)th TTI without DL scheduling information. At this time, if transmission of data of the service having a higher priority is required in the (N+5)th TTI and the same radio resources as those of the retransmission packet are required, the base station forwards DL scheduling information through the region 'D' on the DL L1/L2 control channel to indicate that retransmission in the (N+5)th TTI has been put off until the (N+10)th TTI. In other words, it means that the base station puts off retransmission to the user equipment once. Thus, after receiving the DL scheduling information, the user equipment does not erase corresponding data stored in a buffer of a corresponding HARQ processor and tries to combine the data with the retransmission packet, which will be received in the (N+10)th TTI.

In FIG. 6, the DL scheduling information transmitted through the region 'D' can be transmitted to the user equipment by the following ways.

The first way is to set a specific field to a specific value. For example, a location field of allocated radio resources is set to "0" and then is transmitted to the user equipment. Then, the user equipment identifies that the value of the field, which is set to "0" in the DL scheduling information transmitted thereto, means that the retransmission packet in the current retransmission period will be transmitted in a next retransmission period or a subsequent next retransmission period, and receives the retransmission packet.

The other way is to add a specific field to the DL scheduling information. In this case, the specific field is added to indicate whether retransmission is performed in a corresponding retransmission period or put off until a given retransmission period.

Figure 7:
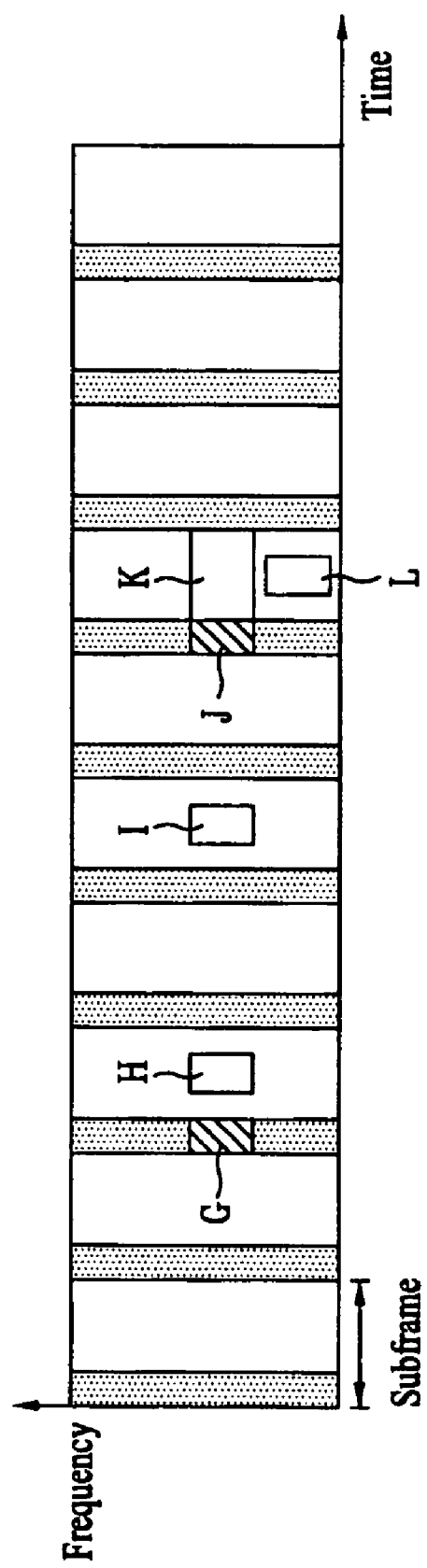

FIG. 7 illustrates a time-frequency plane according to another embodiment of the present invention. Like the embodiment of FIG. 6, the embodiment of FIG. 7 is to support the HARQ scheme when radio resources previously allocated for data retransmission in the aforementioned HARQ scheme are required for reallocation to provide other service having a higher priority.

Referring to FIG. 7, a base station transmits DL scheduling information for a packet to the user equipment through a region 'G' in case of only initial transmission of the packet, and transmits the initial packet to the user equipment through a region 'H' in accordance with the DL scheduling information. If the base station retransmits the packet as it receives NACK from the user equipment in response to the transmitted packet, it transmits a retransmission packet through a region 'I' by using DL scheduling information for the initial packet without separate DL scheduling information.

In view of the user equipment, the user equipment acquires DL scheduling information through the region 'G' on the DL L1/L2 control channel during initial transmission of the packet and thus receives the initial packet through the region 'H.' If the user equipment fail to receive the initial packet successfully, it transmits NACK to the base station. After transmitting NACK, the user equipment receives the retransmission packet from the base station through the region 'I' without separate DL scheduling information after a given time period which is previously set by the base station. The DL scheduling information transmitted to the DL L1/L2 control channel during the initial transmission of the packet is used as information required for receiving the retransmission packet. In other words, the user equipment receives data through the same sub-carriers as those used for the initial packet in a frequency axis in accordance with the same transmission parameters as those used for the initial packet after a given time period passes from a given reference timing point (for example, NACK transmission timing point).

If the user equipment does not successfully receive the retransmission packet transmitted through the region 'I,' it transmits NACK to the base station again. At the time when the base station intends to perform retransmission of the packet as it receives NACK from the user equipment, if radio resources (region 'K.' of FIG. 7) to be used for retransmission are required for data transmission of other services (for example, a service having a higher priority), the base station allocates the radio resources for the service having a higher priority.

The user equipment predicts that a retransmission packet will be transmitted from the base station through the region 'K.' Accordingly, if the base station transmits data corresponding to the service having a higher priority through the region 'K' without separate scheduling information, error occurs in the user equipment. To prevent the error from occurring, the base station transmits DL scheduling information to the user equipment through a region 'J' before transmitting the data of the service having a higher priority through the region 'K.'

The DL scheduling information transmitted through, the region 'J' includes information indicating that the retransmission packet in response to NACK received from the user equipment are not transmitted through the region 'K' and indicating separate radio resources to which the retransmission packet will be transmitted, in addition to the scheduling information required for receiving the data transmitted through the region 'K.'

For example, the DL scheduling information transmitted through the region 'J' includes information indicating that location (or sub-carrier information) of radio resources included in the DL scheduling information transmitted through the region 'G' during transmission of the initial packet has been changed during retransmission and location information of the changed radio resources.

In more detail, at the time when the base station intends to perform transmission of the retransmission packet, if radio resources previously allocated for the retransmission packet are required for data transmission of a service having a higher priority, the base station changes the location of the radio resources by using the DL scheduling information transmitted through the region 'J' to indicate transmission of the retransmission packet. It is supposed that a retransmission period which is previously set includes 5 TTIs. In this case, the user equipment receives data in the Nth TTI. At this time, if radio resources having a frequency A are allocated through the DL scheduling information, the user equipment reads out the frequency A in the (N+5)th TTI and receives data. When retransmission is requested once more, if the frequency A is first required for receiving data of the service having a higher priority, the base station indicates through the DL scheduling information that next retransmission will be performed through a frequency B.

When the user equipment receives the DL scheduling information through the region 'J' on the DL L1/L2 control channel, it receives the retransmission packet through radio resources (frequency and/or time region, region 'L' of FIG. 7) indicated by the DL scheduling information.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on data transmission and reception between the base station and the user equipment. In this case, the base station means a terminal node of a network which directly performs communication with the user equipment. A specific operation which has been described herein as being performed by the base station may be performed by an upper node of the base station as the case may be. In other words, it will be apparent that various operations performed for communication with the user equipment in the network which includes a plurality of network nodes along with the base station may be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention may be implemented by various means, for example, hardware, firmware, software, or their combination. If the embodiment according to the present invention is implemented by hardware, the random access method in the mobile communication system according to the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the random access method in the mobile communication system according to the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

According to the present invention, in the wireless communication system, waste of radio resources in the HARQ operation can be avoided and the radio resources can efficiently be used.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention is applicable to a wireless communication system such as a mobile communication system, a wireless Internet system, and the like.

The invention claimed is:

1. A method of supporting data retransmission in a wireless communication system which uses multiple carriers, the method comprising:
   receiving a negative acknowledgement signal (NACK) from a user equipment in response to a transmitted packet;
   transmitting scheduling information to the user equipment, the scheduling information indicating change of radio resources previously allocated for transmission of a retransmission packet; and
   transmitting the retransmission packet in accordance with the scheduling information,
   wherein the scheduling information includes a location field of allocated radio resources and wherein the change of radio resources previously allocated is indicated by setting the location field to 0,
   wherein setting the location field to 0 indicates that the retransmission packet in the current retransmission period will be transmitted in a following retransmission period, and
   wherein the scheduling information includes information indicating radio resources newly allocated for transmission of the retransmission packet.

2. The method of claim 1, wherein the radio resources correspond to a time-frequency region.

3. A method of supporting data retransmission in a wireless communication system which uses multiple carriers, the method comprising:
   transmitting a negative acknowledgement signal (NACK) in response to a packet transmitted from a base station;
   receiving scheduling information from the base station, the scheduling information indicating change of radio resources previously allocated for transmission of a retransmission packet; and
   receiving the retransmission packet in accordance with the scheduling information,
   wherein the scheduling information includes a location field of allocated radio resources and wherein the change of radio resources previously allocated is indicated by setting the location field to 0, wherein setting the location field to 0 indicates that the retransmission packet in the current retransmission period will be transmitted in a following retransmission period, and wherein the scheduling information includes information indicating radio resources newly allocated for transmission of the retransmission packet.

4. The method of claim 3, wherein the radio resources correspond to a time-frequency region.

5. A user equipment in a wireless communication system which uses multiple carriers, the user equipment being configured to perform the steps of:

transmitting a negative acknowledgement signal (NACK) in response to a packet transmitted from a base station;

receiving scheduling information from the base station, the scheduling information indicating change of radio resources previously allocated for transmission of a retransmission packet; and receiving the retransmission packet in accordance with the scheduling information, wherein the scheduling information includes a location field of allocated radio resources and wherein the change of radio resources previously allocated is indicated by setting the location field to 0, wherein setting the location field to 0 indicates that the retransmission packet in the current retransmission period will be transmitted in a following retransmission period, and wherein the scheduling information includes information indicating radio resources newly allocated for transmission of the retransmission packet.

* * * * *